United States Patent
Ohmori et al.

(10) Patent No.: US 6,803,918 B1
(45) Date of Patent: Oct. 12, 2004

(54) IMAGE PROCESSING APPARATUS

(75) Inventors: Mutsuhiro Ohmori, Kanagawa (JP); Toshio Horioka, Kanagawa (JP)

(73) Assignee: Sony Corporation (JP)

( * ) Notice: Subject to any disclaimer, the term of this patent is extended or adjusted under 35 U.S.C. 154(b) by 809 days.

(21) Appl. No.: 09/260,031

(22) Filed: Mar. 2, 1999

(30) Foreign Application Priority Data

Mar. 4, 1998 (JP) .......... P10-052017
Jan. 26, 1999 (JP) .......... P11-016529

(51) Int. Cl.$^7$ .......... B06T 15/00
(52) U.S. Cl. .......... 345/552; 345/531
(58) Field of Search .......... 345/519, 508, 345/509, 513, 515, 199, 552, 531

(56) References Cited

U.S. PATENT DOCUMENTS

| | | | |
|---|---|---|---|
| 5,230,039 A | | 7/1993 | Grossman et al. |
| 5,706,481 A | * | 1/1998 | Hannah et al. .......... 345/519 |
| 5,767,864 A | * | 6/1998 | Kimura et al. .......... 345/519 |
| 5,838,337 A | * | 11/1998 | Kimura et al. .......... 345/519 |
| 5,877,780 A | * | 3/1999 | Lu et al. .......... 345/519 |
| 6,097,403 A | * | 8/2000 | McMinn .......... 345/519 |
| 6,107,987 A | * | 8/2000 | Coelho .......... 345/154 |
| 6,359,624 B1 | | 3/2002 | Kunimatsu |

FOREIGN PATENT DOCUMENTS

| | | |
|---|---|---|
| EP | 09 270024 | 10/1997 |
| EP | 0 820 037 | 1/1998 |
| EP | 0 889 478 | 1/1999 |
| JP | 09-270024 B1 | 10/1997 |
| JP | 9-270024 | 10/1997 |
| WO | WO97/35316 | 9/1997 |

OTHER PUBLICATIONS

Foley, Computer Graphics: Principles and Practices, 1996, pp. 204–205.*

European Search Report dated Nov. 12, 1999.

European Search Report.

* cited by examiner

Primary Examiner—Michael Razavi
Assistant Examiner—Motilewa Good-Johnson
(74) Attorney, Agent, or Firm—Rader, Fishman & Grauer PLLC; Ronald P. Kananen

(57) ABSTRACT

An image processing apparatus capable of performing flexible, high speed processing, wherein a memory region emptied due to a change of display resolution can be used as a texture memory, increase of an overhead such as switching pages can be prevented, and a decline in the performance is not caused. A built-in DRAM inside a semiconductor chip has a configuration for storing display data and the texture data required by at least one graphic element. The texture data can be stored in portions other than the display regions, so the built-in DRAM can be used efficiently and an image processing apparatus achieving both high speed operation and a reduction of power consumption can be realized.

10 Claims, 15 Drawing Sheets

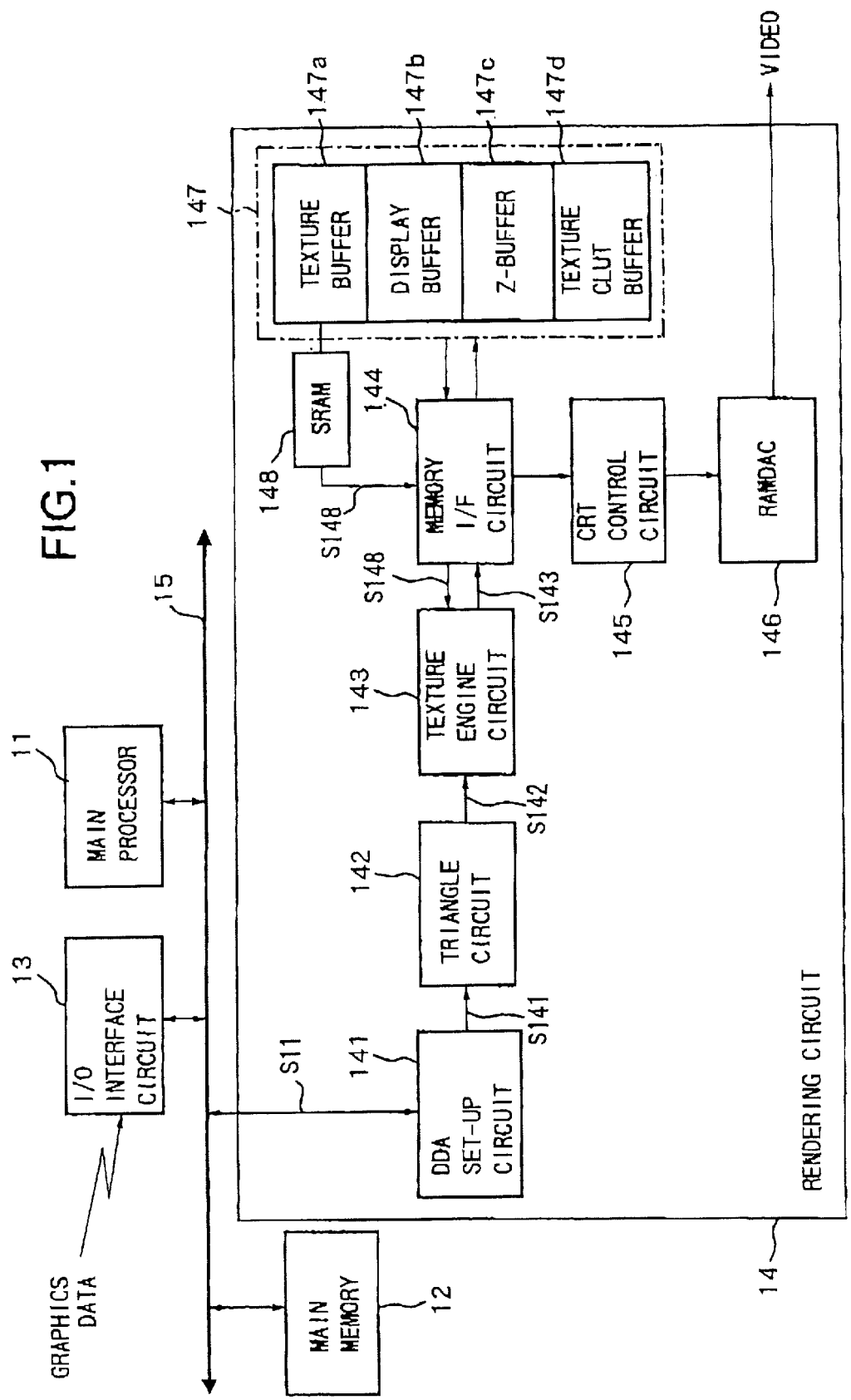

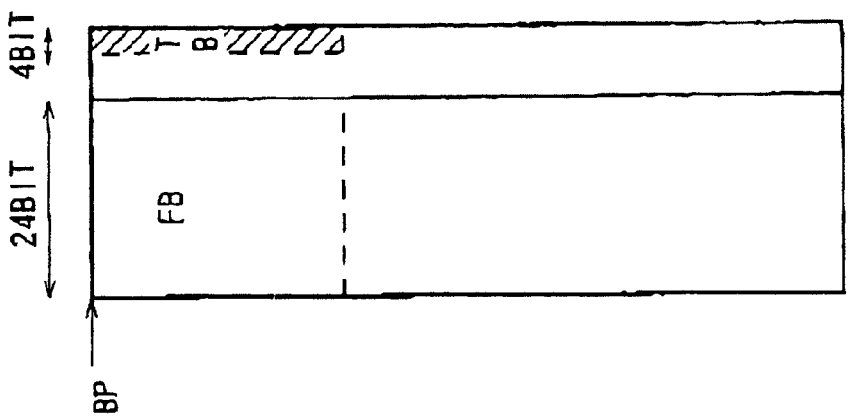
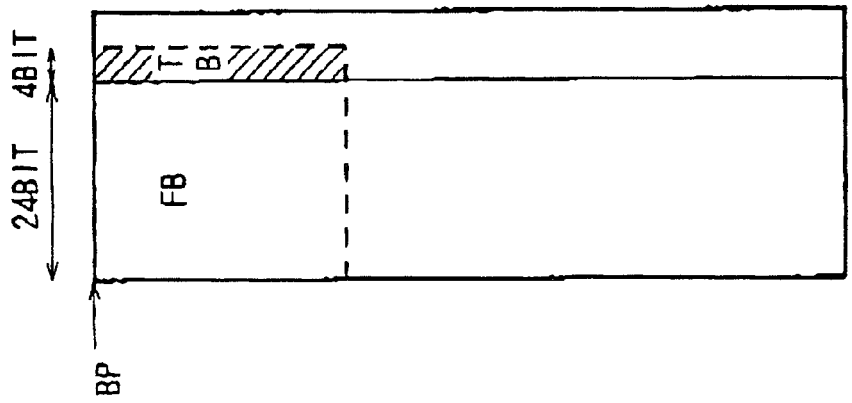
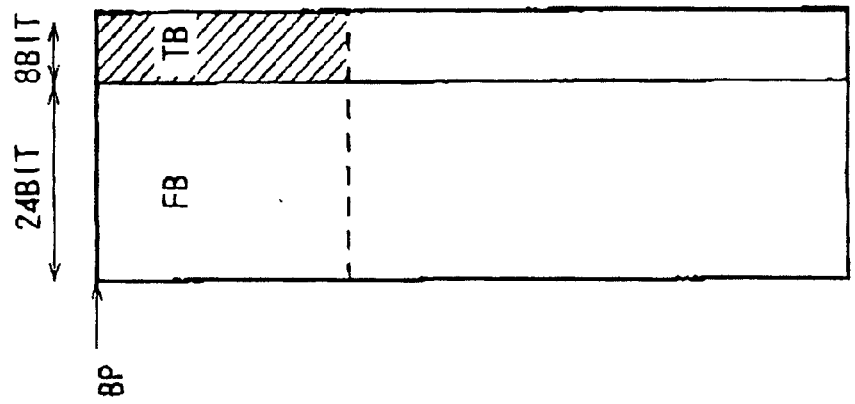

PAGE(ROW)  PAGE ADDRESS=(y[10:5]×bw+x[10:6])
bw:BUFFER WIDTH(SPECIFY"n"of "64×n")

BLOCK(COLUMN)BLOCK ADDRESS=(y[3],x[3],y[2:1])

FIG.6

| R0 | R1 | R2 | R3 | · | · | | | | · | R$_{A2}$ | R$_{A1}$ |
|---|---|---|---|---|---|---|---|---|---|---|---|
| R$_A$ | R$_{A11}$ | · | · | | | | | | | · | · |
| R$_{2A}$ | · | · | | | | | | | | | |
| R$_{3A}$ | · | | · | | | | | | | | |
| · | | | | | | | | | | | |
| · | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| · | · | | | | | | | | | · | · |
| | · | | | | | | | | | · | |

R$_{(B-1) \times A}$        R$_{BA-1}$

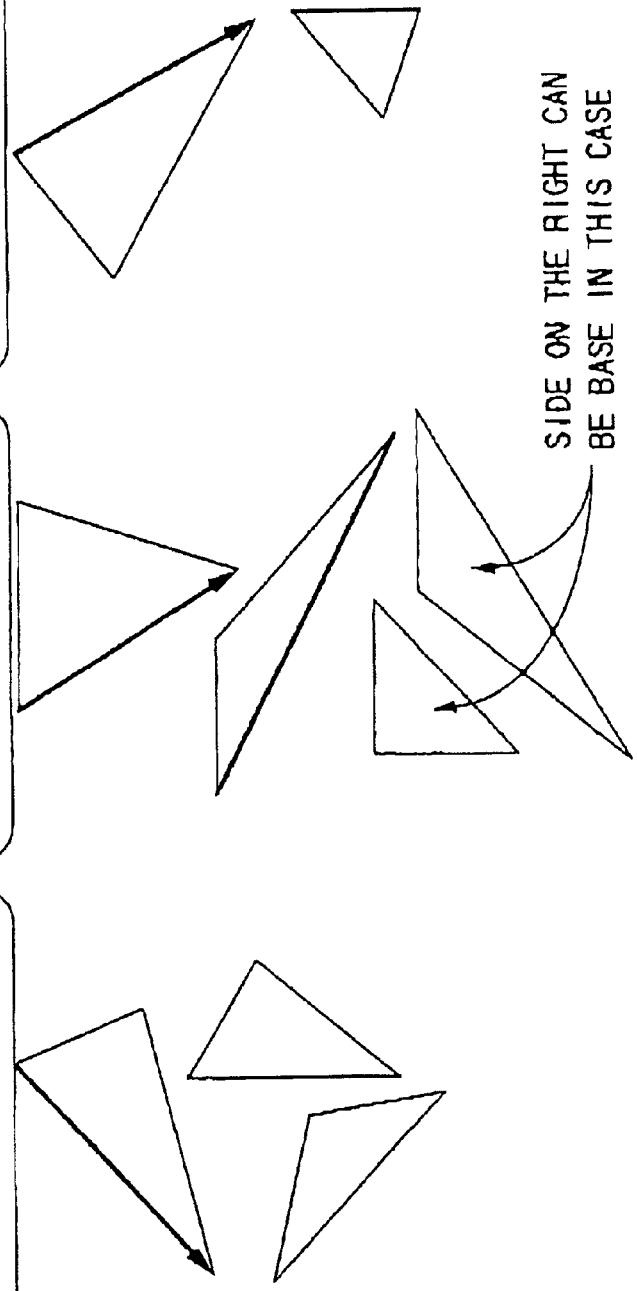

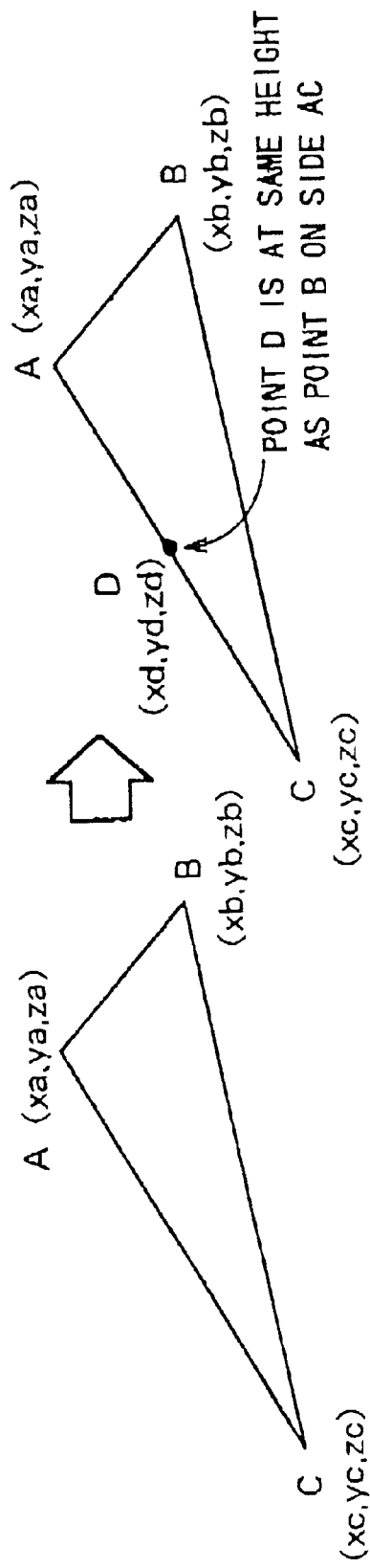

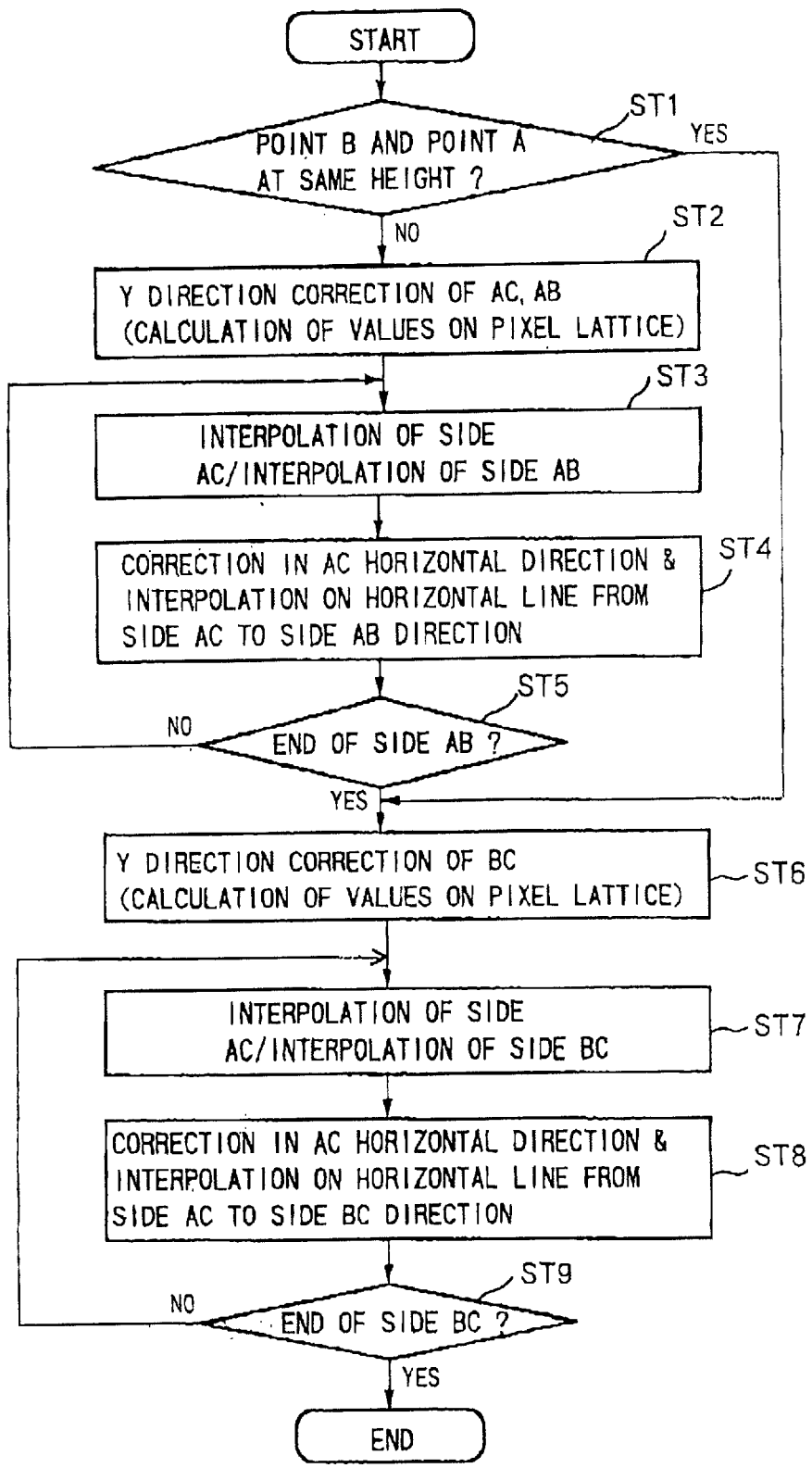

US 6,803,918 B1

IMAGE PROCESSING APPARATUS

BACKGROUND OF THE INVENTION

1. Field of the Invention

The present invention relates to a graphic drawing image processing apparatus, and more particularly to a technical field of storing texture data to be applied to a graphic element to be drawn in a built-in memory when a DRAM or other memory and a logic circuit are provided together.

2. Description of the Related Art

Computer graphics are often used in a variety of computer aided design (CAD) systems and amusement machines. Especially, along with the recent advances in image processing techniques, systems using three-dimensional computer graphics are becoming rapidly widespread.

In three-dimensional computer graphics, the color value of each pixel is calculated at the time of deciding the color of each corresponding pixel. Then, rendering is performed for writing the calculated value of the pixel to an address of a display buffer (frame buffer) corresponding to the pixel.

One of the rendering methods is polygon rendering. In this method, a three-dimensional model is expressed as a composite of triangular unit graphics (polygons). By drawing the polygons as units, the colors of the display screen are decided.

In polygon rendering, coordinates (x, y, z), color data (R, G, B,), homogeneous coordinates (s, t) of texture data indicating a composite image pattern, and a value of the homogeneous term q for the respective vertexes of the triangle in a physical coordinate system are input and processing is performed for interpolation of these values inside the triangle.

Here, the homogeneous term q is simply stated, like an expansion or reduction rate. Coordinates in a UV coordinate system of an actual texture buffer, namely, texture coordinate data (u, v) are comprised of the homogeneous coordinates (s, t) divided by the homogeneous term q to give "s/q" and "t/q" which in turn are multiplied by texture sizes USIZE and VSIZE, respectively.

FIG. 15 is a view of the system configuration showing a basic concept of a three-dimensional computer graphic system.

In this three-dimensional computer graphic system, data of drawing graphics is supplied from a main memory 2 in a main processor 1 or from an input/output (I/O) interface circuit 3 for receiving graphic data from outside via a main bus 4 to a rendering circuit 5 having a rendering processor 5a and a frame buffer memory 5b.

In the rendering processor 5a, a frame buffer memory 5b for maintaining data for display and a texture memory 6 for maintaining texture data to be applied on the surface of a graphic element (for example, a triangle) to be drawn are connected Then, the rendering processor 5a performs processing for drawing the graphic element applied with the texture on its surface for every graphic element to the frame buffer memory 5b.

The frame buffer memory 5b and the texture memory 6 are generally configured by a DRAM (dynamic random access memory). In the system of FIG. 15, the frame buffer memory 5b and the texture memory 6 are configured as physically separated memory systems.

Note that, even after it became possible to provide the DRAM and a logic circuit together, to hold the texture data inside has been difficult due to both the limit of the DRAM capacity and the processing speed.

In the so-called built-in DRAM system of the related art above, when the frame buffer memory and the texture memory are provided separately in separate memory systems, there are the disadvantages as stated below:

First, the frame buffer memory which is emptied due to a change of the display resolution cannot be used as a texture memory.

This becomes a big disadvantage when trying to perform all of the processing in the limited capacity of a built-in DRAM.

Second, when making the frame buffer memory and the texture memory physically identical, in simultaneous access to the frame buffer memory and the texture memory, the overhead of switching pages of the DRAM etc. becomes large, so the performance has to be sacrificed.

These disadvantages are not particularly limited to a graphic drawing apparatus of a built-in DRAM type and have been disadvantages in systems of an externally provided DRAM type as well, but have not been as serious as the built-in type where the capacity is strictly limited.

SUMMARY OF THE INVENTION

An object of the present invention is to provide an image processing apparatus capable of performing flexible and high speed processing, wherein a memory region which is emptied due to a change of display resolution can be used as a texture memory, increase of overhead such as switching pages can be prevented, and a reduction of the performance Is not caused.

To achieve the above object, according to a first aspect of the present invention, there is provided an image processing apparatus comprising a memory circuit for storing display data and texture data required by at least one graphic element and a logic circuit for performing processing for applying the texture data on the surface of the graphic element of the display data based on the stored data of the memory circuit, the memory circuit and the logic circuit being both accommodated in one semiconductor chip.

According to a second aspect of the present invention, there is provided an image processing apparatus for performing rendering by receiving polygon rendering data including three-dimensional coordinates (x, y, z). R (red), G (green), and B (blue), homogeneous coordinates (s, t) of a texture, and a homogeneous term q with respect to vertexes of a unit graphic, at least comprising a memory circuit for storing display data and texture data required by at least one graphic element; an interpolation data generation circuit for interpolating the polygon rendering data of vertexes of the unit graphic to generate interpolation data of pixels positioned inside the unit graphic; and a texture processing circuit for dividing the homogeneous coordinates (s, t) of a texture included in the interpolation data by the homogeneous term q to generate "s/q" and "t/q", using a texture address corresponding to the "s/q" and "t/q" to read texture data from the memory circuit, and applying the texture data on the surface of the graphic element of the display data; the memory circuit, the interpolation data generation circuit, and the texture processing circuit being accommodated in one semiconductor chip.

In the present invention, the memory circuit is divided into a plurality of modules having identical functions; and the logic circuit accesses the modules in parallel.

Further, in the present invention, display elements at adjacent addresses in a display address space are arranged to be different memory blocks in the memory circuit.

Further, in the present invention, indexes in index colors and values of a color look-up table for referring to colors are stored in the memory circuit.

Further, information of a depth of an object to be drawn is stored in the memory circuit.

According to the present invention, by providing a DRAM or other memory circuit and a logic circuit together in one semiconductor chip and by storing display data and texture data required by at least one graphic element in a built-in memory circuit, the texture data can be stored in a portion other than a display region, so the built-in memory can be efficiently used.

Also, by giving identical functions in the memory circuit in parallel as a plurality of independent modules, the efficiency of parallel operations is improved. When the number of bits of the data is simply large, the efficiency of use of data is deteriorated and improvement of the performance is limited to cases of certain conditions, but to Improve the average performance, bit lines can be efficiently used by providing a plurality of modules having certain degrees of functions.

Further efficient usage of the bit lines becomes possible by tinkering with the arrangement of the built-in memory circuit, that is, the address space occupied by the independent memory plus function modules.

When there are frequent accesses to relatively fixed display regions as in drawing graphics, by arranging the display elements at adjacent addresses to be different memory blocks from each other in the display address space, the probability increases of the modules being able to perform processing simultaneously and the drawing performance can be improved. Frequent accesses to a fixed display region, when drawing inside the closed region of a triangle etc., result in access to adjacent addresses because the internal display elements are adjacent to each other.

Further, in order to store more texture data, the texture data can be compressed by storing indexes of index colors and values of a color look-up table therefor inside the built-in memory circuit As a result, the built-in memory circuit can be efficiently used.

Also, according to the present invention, by storing depth information of an object to be drawn in the built-in memory circuit, hidden plane processing can be performed simultaneously and in parallel with the drawing.

BRIEF DESCRIPTION OF THE DRAWINGS

These and other objects and features of the present invention will become clearer from the following description of the preferred embodiments given with reference to the accompanying drawings, In which:

FIG. 1 is a block diagram of the configuration of a three-dimensional computer graphic system according to the present invention;

FIGS. 2A to 2C are views for schematically explaining methods of storing display data, depth data, and texture data In a DRAM according to the present invention;

FIG. 6 is a view for explaining a unit block constituting the texture data;

FIG. 10 is a view for explaining the sorting processing of the vertexes of a triangle DDA circuit according to the present invention;

FIG. 11 is a view for explaining the calculation processing of an inclination in the horizontal direction of a triangle DDA circuit according to the present invention;

FIG. 13 is a flow chart for explaining the procedure for interpolation of the vertex data of a triangle DDA circuit according to the present invention;

DESCRIPTION OF THE PREFERRED EMBODIMENTS

Figure 3:
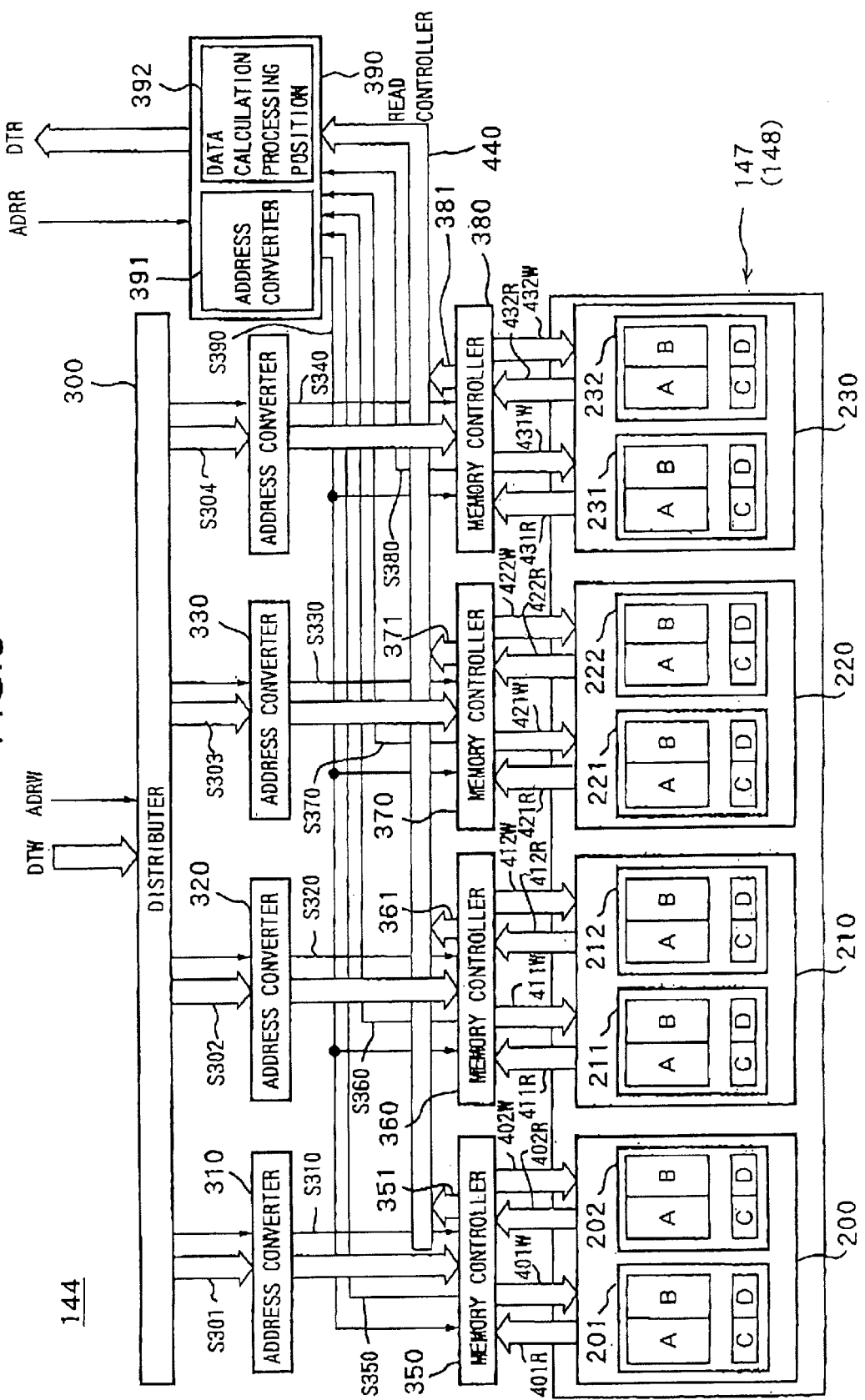
FIG. 3 is a block diagram of a specific example of the configuration of the DRAM, SRAM, and memory I/F circuit for accessing a DRAM and SRAM in the rendering circuit according to the present invention.

Below, preferred embodiments will be described with reference to the accompanying drawings.

In the present embodiment, an explanation will be made of a three-dimensional computer graphic system for displaying a desired three-dimensional image of any three-dimensional object model at a high speed on a display such as a CRT (cathode ray tube)—which is often used in personal computers etc.

FIG. 1 is a view of the system configuration of a three-dimensional computer graphic system 10 as an image processing apparatus according to the present invention.

The three-dimensional computer graphic system 10 expresses a three-dimensional model as a composite of triangular unit graphics (polygons). By drawing the polygons, the colors of the pixels of the display screen are decided and the polygon rendering for display on the display is performed.

Also, in the three-dimensional computer graphic system 10, a three-dimensional object is expressed by using a z-coordinate indicating a depth in addition to the coordinates (x, y) indicating a position on a plane. The three coordinates (x, y, z) specify any one point in a three-dimensional space.

As shown in FIG. 1, the three-dimensional computer graphic system 10 is connected to a main processor 11, a main memory 12, an I/O interface circuit 13, and a rendering circuit 14 via a main bus 15.

Below, the functions of the respective components will be explained.

The main processor 11 reads the necessary graphic data from the main memory 12 in accordance with, for example, the state of progress of an application and performs clipping, lighting, and geometric processing etc. on the graphic data and generates polygon rendering data. The main processor 11 outputs the polygon rendering data S11 to the rendering circuit 14 via the main bus 15.

The I/O interface circuit 13 receives as input the motion control information or the polygon rendering data from the outside in accordance with need and outputs the same to the rendering circuit 14 via the main bus 15.

Here, the polygon rendering data includes the data (x, y, z, R, G, B, s, t, q) of each of the three vertexes of the polygon.

Here, the (x, y, z) data indicates the three-dimensional coordinates of a vertex of the polygon, and (R. G. B) indicates the luminance values of red, green, and blue at the three-dimensional coordinates, respectively.

Among the (s, t, q) data, the (s, t) indicates homogeneous coordinates of a corresponding texture and the q indicates a homogeneous term. Here, the texture sizes USIZE and VSIZE are respectively multiplied with the "s/q" and "t/q" to obtain the texture coordinate data (u, v). The texture coordinate data (u, v) is used for accessing the texture data stored in the texture buffer 147a.

Namely, the polygon rendering data consists of physical coordinate values of the vertexes of a triangle and colors and texture data of each of the vertexes.

The rendering circuit 14 will be explained in detail below.

As shown in FIG. 1, the rendering circuit 14 comprises a DDA (digital differential analyzer) set-up circuit 141, a triangle DDA circuit 142, a texture engine circuit 143, a memory interface (I/F) circuit 144, a CRT control circuit 145, a RAMDAC circuit 146, a DRAM 147, and an SRAM (static RAM) 148.

The rendering circuit 14 of the present embodiment is provided with a logic circuit and a DRAM 147 for storing at least display data and texture data together in one semiconductor chip.

DRAM 147

The DRAM 147 functions as a texture buffer 147a, a display buffer 147b, a z-buffer 147c, and a texture color look-up table (CLUT) buffer 147d.

Also, the DRAM 147 is, as will be explained later on, divided into a plurality of modules (4 in this embodiment) having identical functions.

Also, in the DRAM 147, in order to store more texture data, indexes in index colors and values for the color look-up table therefor are stored in the texture CLUT buffer 147d.

The indexes and the values of the color look-up table are used for texture processing. Namely, a texture element is normally expressed by the total 24 bits of the 8 bits of each of R, G, and B. With this, however, the amount of data swells, so one color is selected from, for example, 256 colors selected in advance and that data is used for the texture processing. As a result, with 256 colors, the texture elements can be expressed by 8 bits. A conversion table from the indexes to an actual color is necessary, however, the higher the resolution of the texture, the more compact the texture data can become.

Due to this, compression of the texture data becomes possible and the built-in DRAM can be used efficiently.

Further, depth information of the object to be drawn is stored in the DRAM 147 in order to perform hidden plane processing simultaneously and in parallel with the drawing.

Note that as a method of storing the display data, the depth data, and the texture data, for example, the display data is stored at a predetermined position in the memory block, for example, continuously from the top, then the depth data is stored, and then the texture data is stored in continuous address spaces for each type of texture in the remaining vacant region.

Explaining this conceptually with reference to the drawings, as shown in FIGS. 2A to 2C, the display data and the depth data are stored, for example, by a 24-bit width in the region indicated by PB in the figure from a position indicated by a so-called base pointer (BP), while the texture data is stored in the remaining vacant region, that is, the 8-bit width region, as shown by TB in the figure.

As a result, the texture data can be stored efficiently.

FIG. 3 is a block diagram of a specific example of the configuration of the DRAM 147, the SRAM 148, and the memory I/F circuit 144 accessing the DRAM 147 and the SRAM 148.

As shown in FIG. 3, the DRAM 147 and the SRAM 148 shown in FIG. 1 are divided into four memory modules 200, 210, 220, and 230, as explained above.

The memory module 200 comprises memories 201 and 202.

The memory 201 comprises banks 201A and 201B comprising a part of the DRAM 147 and banks 201C and 201D comprising a part of the SRAM 148.

Also, the memory 202 comprises banks 202A and 202B comprising a part of the DRAM 147 and the banks 202C and 202D comprising a part of the SRAM 148.

Note that the banks 201C, 201D, 202C, and 202D comprising the SRAM 148 are simultaneously accessible.

The memory module 210 comprises memories 211 and 212.

The memory 211 comprises banks 211A and 211B comprising a part of the DRAM 147 and banks 211C and 211D comprising a part of the SRAM 148.

Also, the memory 212 comprises banks 212A and 212B comprising a part of the DRAM 147 and banks 212C and 212D comprising a part of the SRAM 148.

Note that the banks 211C, 211D, 212C, and 212D comprising the SRAM 148 are simultaneously accessible.

The memory module 220 comprises memories 221 and 222.

The memory 221 comprises banks 221A and 221B comprising a part of the DRAM 147 and banks 221C and 221D comprising a part of the SRAM 148.

Also, the memory 222 comprises banks 222A and 222B comprising a part of the DRAM 147 and banks 222C and 222D comprising a part of the SRAM 148.

Note that the banks 221C, 221D, 222C, and 222D comprising the SRAM 148 are simultaneously accessible.

The memory module 230 comprises memories 231 and 232.

The memory 231 comprises banks 231A and 231B comprising a part of the DRAM 147 and banks 231C and 231D comprising a part of the SRAM 148.

Also, the memory 232 comprises banks 232A and 232B comprising a part of the DRAM 147 and banks 232C and 232D comprising a part of the SRAM 148.

Note that the banks 231C, 231D, 232C, and 232D comprising the SRAM 148 are simultaneously accessible.

Here, each of the memory modules 200, 210, 220, and 230 has all of the functions of the texture buffer 147a, the display buffer 147b, the z-buffer 147c, and the texture CLUT buffer 147d shown in FIG. 1.

Namely, each of the memory modules 200, 210, 220, and 230 stores all of the texture data, the drawing data ((R, G, B) data), the z-data, and the texture color look-up table data of corresponding pixels.

Note that the memory modules 200, 210, 220, and 230 store data of different pixels from each other.

Here, the texture data, the drawing data, the z-data, and the texture color look-up table data for 16 pixels being processed simultaneously are stored in mutually different banks 201A, 201B, 202A, 202B, 211A, 211B, 212A, 212B, 221A, 221B, 222A, 222B, 231A, 231B, 232A, and 232B.

Due to this, the memory I/F circuit 144 can simultaneously access the DRAM 147 for data of, for example, 2×8 pixels, that is, 16 pixels.

Note that the memory I/F circuit 144, as will be explained later on, accesses (writes) the DRAM 147 based on so-called predetermined interleave type addressing.

Figure 4A:
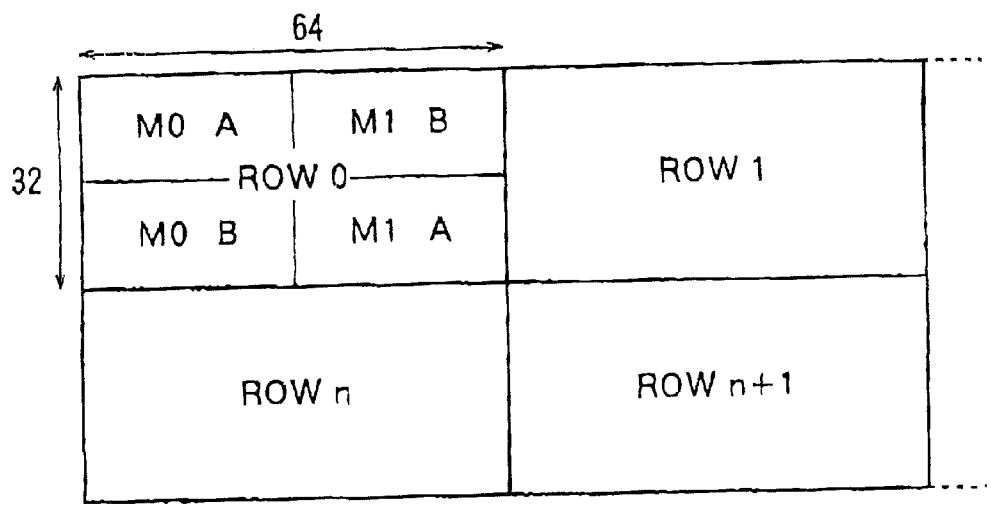
FIGS. 4A and 4B are schematic views of an example of the configuration of a DRAM buffer according to the present invention.
Figure 4B:
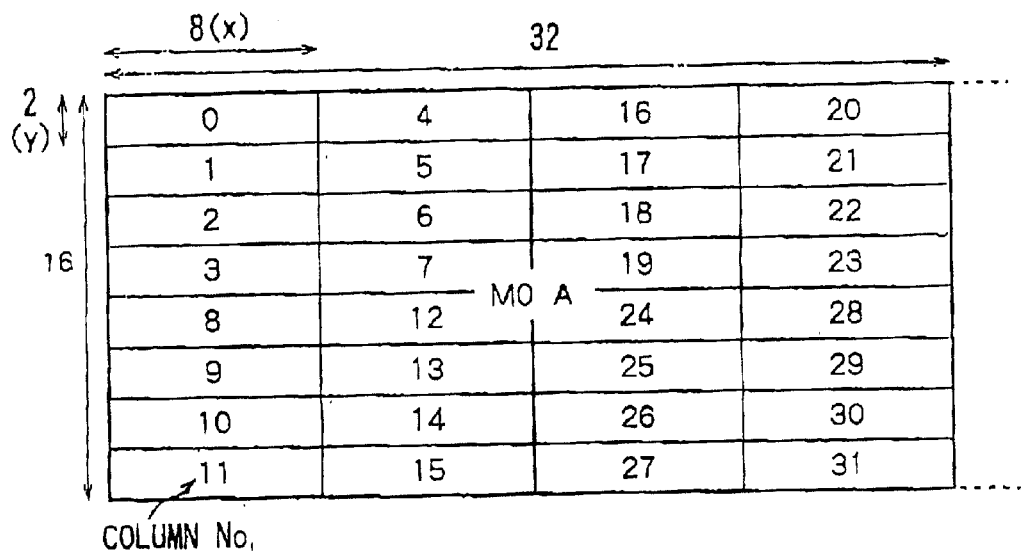

FIGS. 4A and 4B are schematic views of an example of the configuration of the DRAM 147 serving as a buffer (for example, a texture buffer).

As shown in FIGS. 4A and 4B, data accessed in a 2×8 pixel region is stored in a region indicated by a page (row) and a block (column).

Each of the rows ROW0 to ROWn+1 are, as shown in FIG. 4A, respectively divided into 4 columns (blocks) M0A, M0B, M1A, and M1B.

Accesses (writing and reading) are performed in regions of a boundary of 8 pixels each in an x-direction and of an even number of boundaries in a y-direction.

Due to this, access is not made to a region straddling, for example, the row ROW0 and the row ROW1, so that so-called page violation does not occur.

Note that the texture data respectively stored in the banks 201A, 201B, 202A, 202B, 211A, 211B, 212A, 212B, 221A. 221B. 222A. 222B. 231A. 231B, 232A, and 232B are stored in the banks 201C, 201D, 202C, 202D, 211C, 211D, 212C, 212D, 221C, 221D, 222C, 222D, 231C, 231D, 232C, and 232D.

Next, storage patterns of the texture data in the texture buffer 147a based on the interleave type addressing will be explained in further detail with reference to FIGS. 5 to 7.

Figure 5:
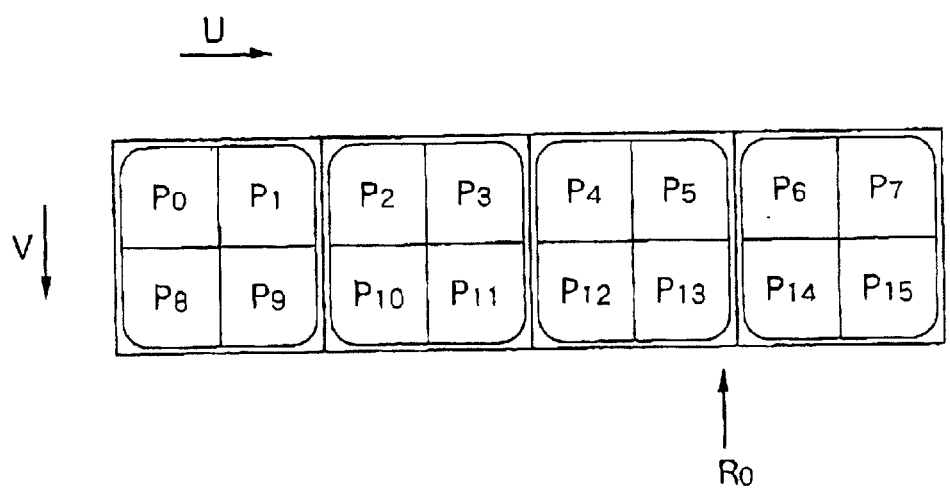
FIG. 5 is a view for explaining simultaneously accessible pixel data included in the texture data.
Figure 6:
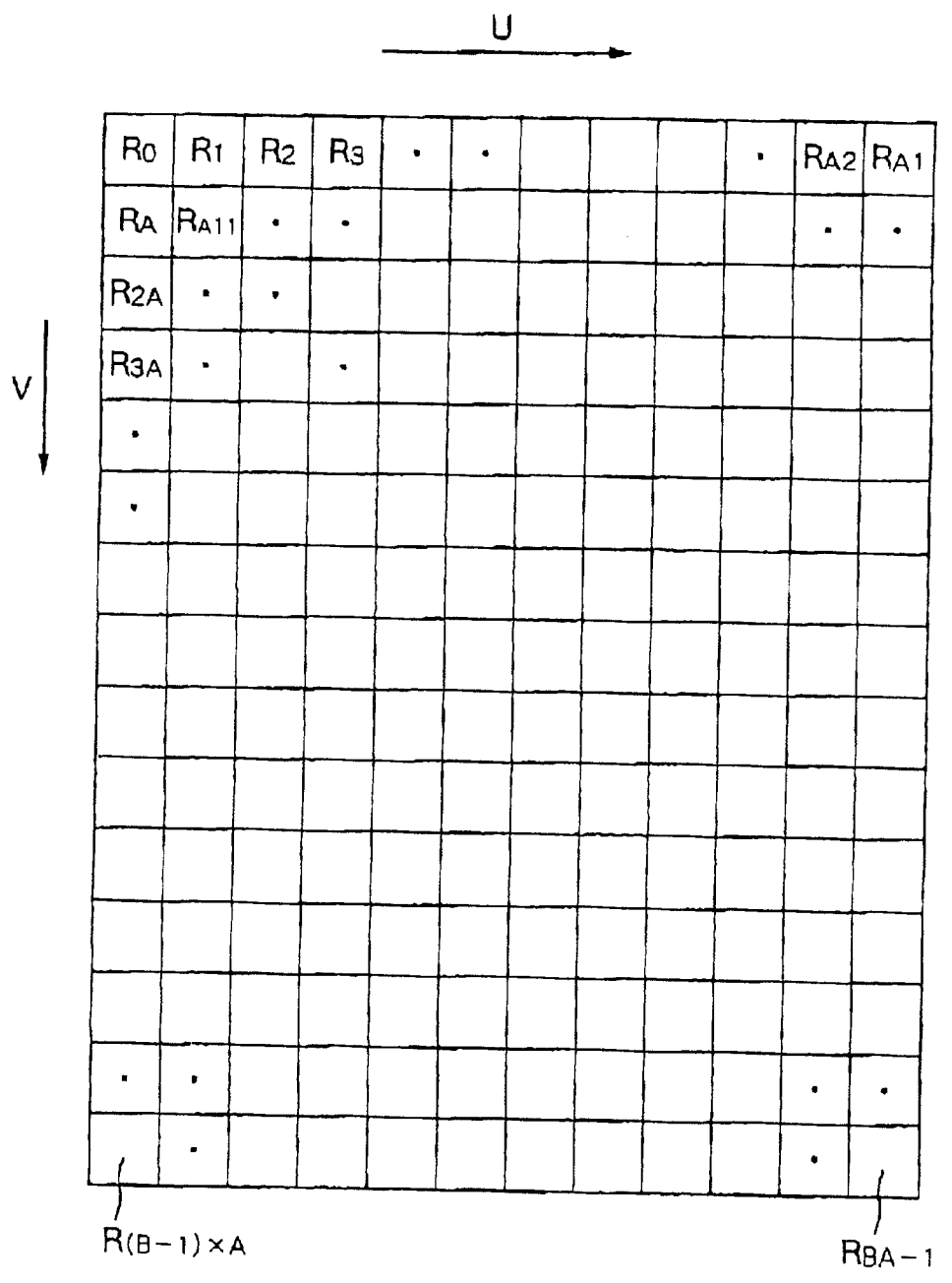
Figure 7:
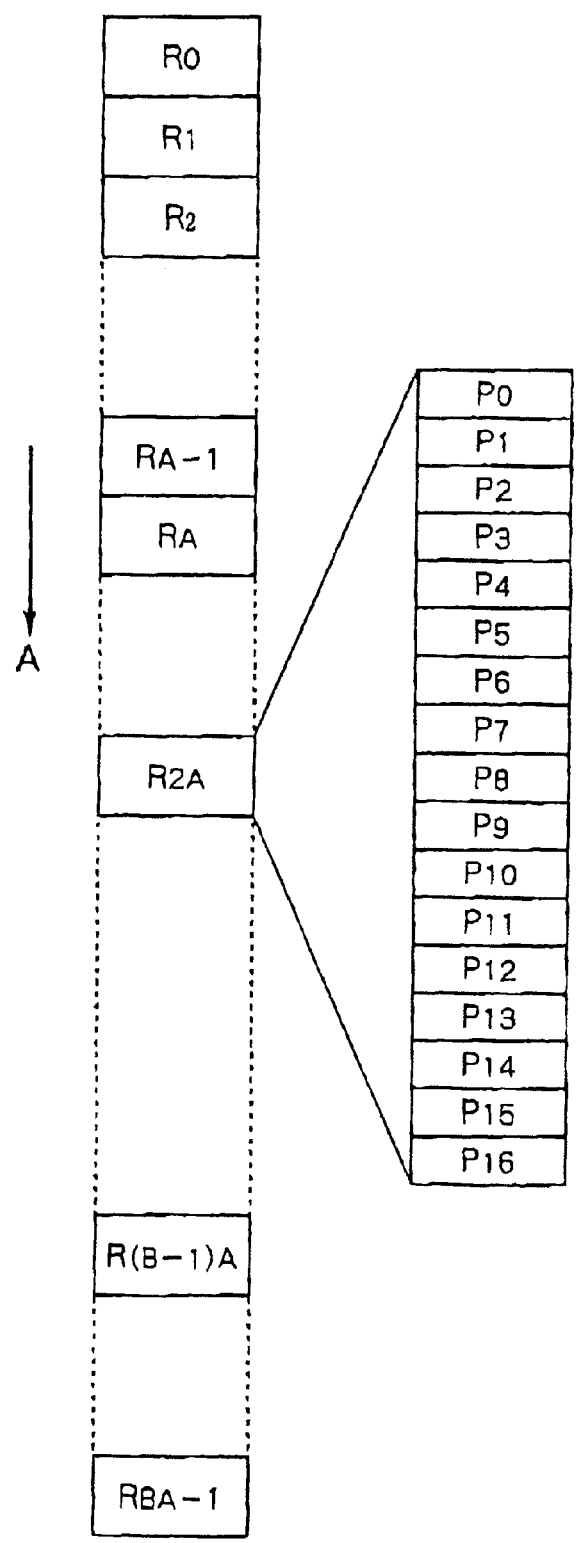
FIG. 7 is a view for explaining the address space of a texture buffer.
Figure 8:
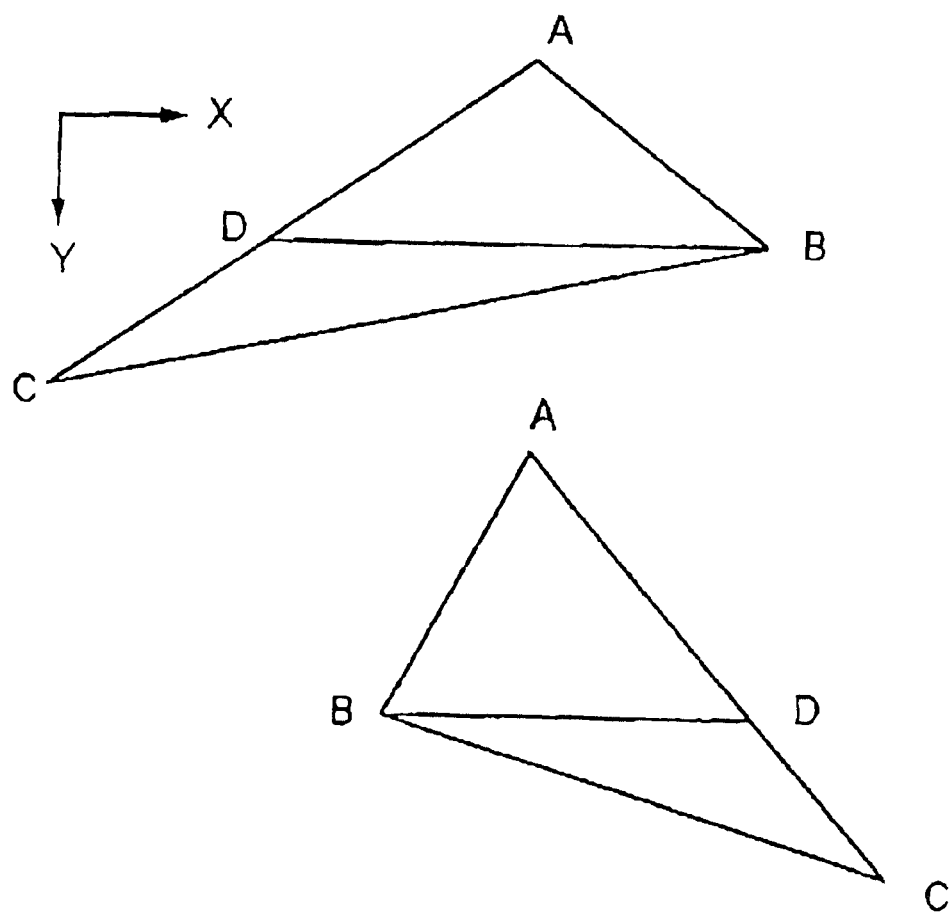
FIG. 8 is a view for explaining the function of a DDA set-up circuit according to the present invention.

FIG. 5 is a view for explaining simultaneously accessible pixel data included in the texture data, FIG. 6 is a view for explaining unit blocks comprising texture data, and FIG. 7 is a view for explaining an address space of the texture buffer.

In the present embodiment, as shown in FIG. 5, pixel data $P_0$ to $P_{15}$ included in the texture data, arranged in a 2×8 matrix, and indicating color data of pixels are simultaneously accessible.

The pixel data $P_0$ to $P_{15}$ have to be stored in different banks of the SRAM 148 comprising the texture buffer 147a.

In the present embodiment, the pixel data $P_0$, $P_1$, $P_8$, and $P_9$ are respectively stored in the banks 201C and 201D of the memory 201 and banks 202C and 202D of the memory 202 shown in FIG. 3. Also, the pixel data $P_2$, $P_3$, $P_{10}$, and $P_{11}$ are respectively stored in the banks 211C and 211D of the memory 211 and banks 212C and 212D of the memory 212 as shown in FIG. 3. The pixel data $P_4$, $P_5$, $P_{12}$, and $P_{13}$ are respectively stored in the banks 221C and 221D of the memory 221 and banks 222C and 222D of the memory 222 as shown in FIG. 3. Further, the pixel data $P_6$, $P_7$, $P_{14}$, and $P_{15}$ are respectively stored in the banks 231C and 231D of the memory 231 and the banks 232C and 232D of the memory 232 as shown in FIG. 3.

In the present embodiment, the set of pixel data $P_0$ to $P_{15}$ of the pixels positioned inside a block region and simultaneously processed is called a unit block $R_1$. For example,
texture data indicating one image is composed of unit blocks $R_0$ to $R_{BA-1}$ arranged in a B×A matrix, as shown in FIG. 6.

The unit blocks $R_0$ to $R_{BA-1}$ are, as shown in FIG. 7, stored in the DRAM 147 comprising the texture buffer 147a so as to have continuous addresses in a one-dimensional address space. Also, the pixel data $P_0$ to $P_{15}$ in each of the unit blocks $R_0$ to $R_{BA-1}$ are stored in different banks from each other in the SRAM 148 so as to have continuous addresses in a one-dimensional address space.

Namely, a unit block composed of pixel data which are simultaneously accessible is stored in the texture buffer 147a so as to have continuous addresses in a one-dimensional address space.

DDA Set-Up Circuit 141

Prior to the succeeding triangle DDA circuit 142 performing linear interpolation on the values of the vertexes of a triangle on a physical coordinate system to obtain information of the color and depth of the pixels inside the triangle, the DDA set-up circuit 141 performs a set-up operation for obtaining the difference of a side of the triangle from a horizontal direction etc. for the data (z, R, G, B, s, t, q) indicated by the polygon rendering data S11.

Specifically, this set-up operation uses values of a starting point and an end point and the distance between the two points to calculate the change of values to be sought in the case of movement by a unit length.

The DDA set-up circuit 141 outputs the calculated change data S141 to the triangle DDA circuit 142.

The function of the DDA set-up circuit 141 will be further explained with reference to FIG. 5.

As explained above, the main processing of the DDA set-up circuit 141 is to obtain the change inside a triangle composed of three vertexes given various information (color and texture coordinates) at vertexes reduced to physical coordinates through the former geometric processing so as to calculate basic data for the later linear interpolation.

Note that the data of each vertex of the triangle is, for example, configured by 16 bits of x- and y-coordinates, 24 bits of the z-coordinate, 12 bits (=8+4) of the color values for the RGB, and 32 bits of floating decimal values (IEEE format) of the s, t, q texture coordinates.

While the drawing of a triangle is reduced to the drawing of a horizontal line, this makes it necessary to obtain the starting values at the starting point of the drawing of the horizontal line.

In drawing the horizontal line, the direction of drawing is made constant in one triangle. For example, when drawing from the left to the right, the X with respect to a displacement in the Y-direction of a side on the left and the above various changes are calculated first, then these are used to find the X-coordinate of the left-most point when moving from a vertex to the next horizontal line and values of the above various information (points on a side change in both the X- and Y-directions, so calculation is impossible only from the inclination of the Y-direction).

Only the position of the end point is required for the side on the right, so only the change of x with respect to the displacement in the Y-direction need be investigated.

Regarding the drawing of a horizontal line, since the inclination in the horizontal direction is uniform in the same triangle, the inclinations of the above various information are calculated.

The given triangle is sorted in the Y-direction and the upper-most point is set to be A. Next, the remaining two vertexes are compared in terms of the positions in the X-direction and the point on the right is set to be B. By doing this, the processing can be divided into only two or so steps.

Triangle DDA Circuit 142

The triangle DDA circuit 142 uses the change data S141 input from the DDA set-up circuit 141 to calculate the linearly interpolated (z, R, G, B, s, t, q) data at each pixel inside the triangle.

The triangle DDA circuit 142 outputs the data (x, y) for each pixel and the (z, R, G, B, s, t, q) data at the (x, y) coordinates to the texture engine circuit 143 as the DDA data (interpolation data) S142.

For example, the triangle DDA circuit 142 outputs the DDA data S142 of the 8 (=2×4) pixels positioned inside a block being processed in parallel to the texture engine circuit 143.

Figure 9:
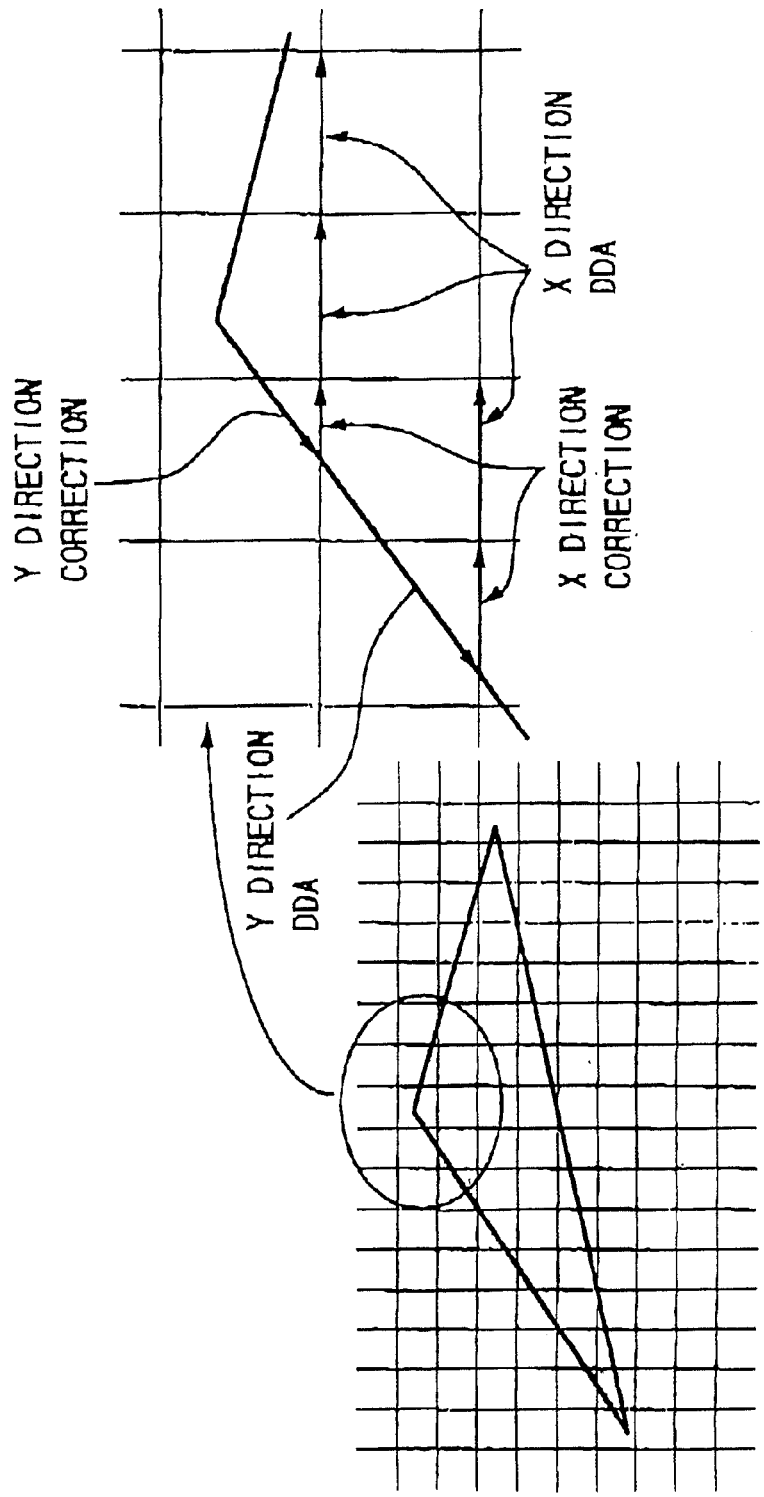
FIG. 9 is a view for explaining the function of a triangle DDA circuit according to the present invention.

A further explanation will be made of the function of the triangle DDA circuit 142 with reference to FIG. 9.

As explained above, inclination information of the above various information of the sides and horizontal direction of a triangle is prepared by the DDA set-up circuit 141. The basic processing of the triangle DDA circuit 142 receiving this information consists of the calculation of the initial values of the horizontal line by interpolation of the various information on the sides of the triangle and the interpolation of the various information on the horizontal line.

Here, what must be noted most is that the calculation of results of the interpolation requires calculation of the values at the center of a pixel.

The reason is that if the value calculated is off from the center of the pixel, while there is not much to worry about in the case of a still picture, the flickering of the image will stand out in a motion picture.

The various information at the left-most side of a first horizontal line can be obtained by multiplying the inclination on the side with the distance from the vertex to the first line.

The various information at the starting point of the next line can be calculated by adding the inclination of the side.

The value at the first pixel of the horizontal line can be calculated by adding the value obtained by multiplying the distance to the first pixel with the inclination in the horizontal direction to the value at the starting point of the line. The value at the next pixel of the horizontal line can be calculated by adding to the first pixel value the inclination in the horizontal direction successively.

Next, sorting of vertexes will be explained with reference to FIG. 10.

By sorting the vertexes in advance, the branching of the successive processing can be reduced to a minimum and contradictions can be made harder to occur inside one triangle as much as possible even in interpolation.

As the method of sorting, first, all of the vertexes supplied are sorted In the Y-direction and the upper-most point and the lower-most point are defined as the point A and point C, respectively. The remaining point is defined as the point B.

By doing so, in the processing, the side extending the longest in the Y-direction becomes a side AC. First, the side AC and the side AB are used for the interpolation of the region between the two sides, then interpolation is performed for the region between the side BC and the side AC, that is, leaving the side AC as it is and changing from the side AB. Also, it will be understood that it is sufficient to perform processing with respect to the side AC and the side BC for correction on the pixel coordinate lattice in the Y-direction.

Since branching of the processing after sorting becomes unnecessary in this way, the processing can be performed simply by supplying the data, bugs can be prevented from occurring, and the configuration becomes simple.

Also, since the direction of the interpolation in one triangle can be made constant by setting a starting point on the side BC, the direction of interpolation (span) in the horizontal direction becomes constant and any computation errors which occur are accumulated from the side BC to other sides. Since the direction of the accumulation becomes constant, errors between adjacent sides become less conspicuous.

Next, the calculation of the inclination in the horizontal direction will be explained with reference to FIG. 11.

The inclination (variables) of the variables (x, y, z, R, G, B, s, t, q) inside a triangle with respect to (x, y) becomes constant due to the linear interpolation.

Accordingly, the inclination in the horizontal direction, that is, the inclination on each of the horizontal lines (span), becomes constant for all spans, so the inclination is obtained prior to the processing of the spans.

As a result of sorting the given vertexes of the triangle in the Y-direction, the side AC is defined again to be the longest extending side, so there is always a point of intersection of a line extending from the vertex B in the horizontal direction and the side AC. The point is defined as D.

After this, by just obtaining the change between the point B and D, the inclination in the horizontal direction, that is, in the x-direction, can be obtained.

Specifically, the x- and z-coordinates at the point D becomes as shown in the equations (1) below.

$$x_d = \{(y_d-y_a)/(y_c-y_a)\} \cdot (x_c-x_a)$$

$$z_d = \{(y_d-y_a)/(y_c-y_a)\} \cdot (z_c-z_a) \quad (1)$$

When obtaining the inclination of the variable z in the x-direction based on this, the following is obtained:

$$\Delta z/\Delta x = (z_d-z_b)/(x_d-x_b)$$

$$= [\{(y_d-y_a)/(y_c-y_a)\} \cdot (z_c-z_a)-z_b]/[\{(y_d-y_a)/(y_c-y_a)\} \cdot (x_c-x_a)-x_b]$$

$$= \{z_b(y_c-y_a)-(z_c-z_a)(y_c-y_a)\}/\{x_b(y_c-y_a)-(z_c-z_a)(y_c-y_a)\}$$

Figure 12A:
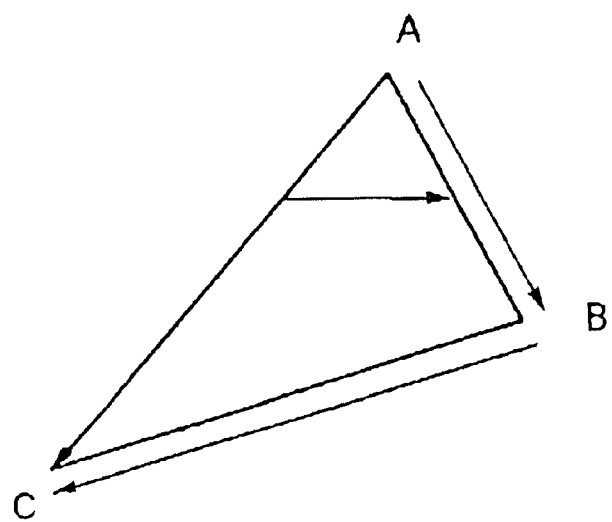
FIGS. 12A and 12B are views for explaining a procedure for interpolation of the vertex data of a triangle DDA circuit according to the present invention.
Figure 12B:
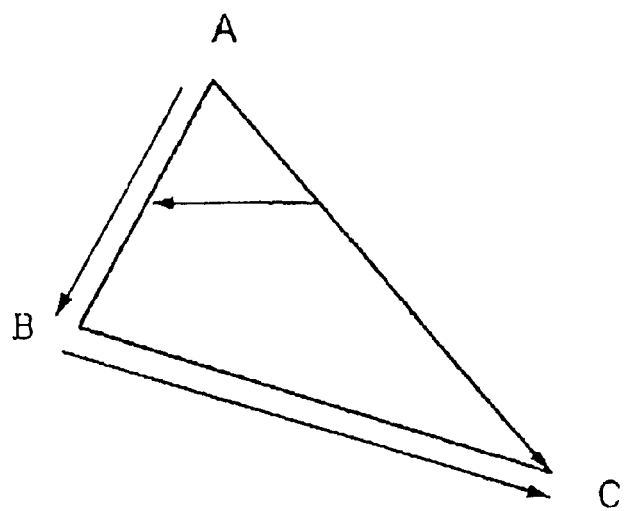

Next, an example of the routine for interpolation of vertex data will be explained with reference to FIGS. 12A, 12B and 13.

After the processing for sorting the vertexes, calculating the inclination in the horizontal direction, and calculating the inclination on each of the sides, interpolation is carried out using the results.

Depending the position of the point B, the processing at a span splits in two directions. This is because it is desired to perform the processing by always using the side extending the longest in the Y-direction as a starting point so as to try to prevent trouble as much as possible by making the direction of accumulation of errors between respective spans in interpolation inside one triangle constant.

When the point B is at the same height as the point A, the first half of the processing is skipped. Therefore, the processing can be streamlined by just providing a skippable mechanism rather than branching.

When trying to improve the processing capability by simultaneously processing a plurality of spans, it is desired to obtain the inclination in the Y-direction, however it is necessary to carry out the processing again from the sorting of the vertexes. However, the processing before the interpolation processing is enough, so the processing system as a whole becomes simpler.

Specifically, when point B is not the same height as the point A, Y-direction correction of AC and AB (calculation of values on a pixel lattice) is performed steps (ST1 and ST2) and the interpolation on the side AC and the interpolation on the side AB are performed step (ST3).

Then, the correction in the AC horizontal direction and the interpolation on the horizontal line from the side AC in the side AB direction step (ST4) are carried out.

The above processing of steps ST3 and ST4 are performed until the end of the side AB step (ST5).

When the processing of steps ST2 to ST4 until the end of the side AB is completed or when it is judged at step ST1 that the point B is the same height as the point A, the Y-direction correction of BC (calculation of values on the pixel lattice) is carried out step (ST6) and the Interpolation on the side AC and the interpolation on the side BC are carried out step (ST7).

Then, the correction in the AC horizontal direction and the interpolation on the horizontal line (span) are carried out step (ST8).

The processing of the above steps ST7 and ST5 is carried out until the end of the side BC step (ST9).

Texture Engine Circuit 143

The texture engine circuit 143 performs the calculation of "s/q" and "t/q", the calculation of the texture coordinate data (u, v), and the reading of the (R, G, B) data from the texture buffer 147a in a pipeline format.

Note that the texture engine circuit 143 performs the processing on the 8 pixels positioned inside a predetermined block simultaneously in parallel.

The texture engine circuit 143 performs the operation for dividing the data s by the data q and the operation for dividing the data t by the data q on the (s, t, q) data indicated by the DDA data S142.

The texture engine circuit 143 is provided with, for example, eight division circuits, not illustrated, and performs the division "s/q" and "t/q" simultaneously on the 8 pixels.

Also, the texture engine circuit 143 respectively multiplies the texture sizes USIZE and VSIZE with the division results "s/q" and "t/q" to generate the texture coordinate data (u, v).

The texture engine circuit 143 outputs a read request including the generated texture coordinate data (u, v) to the SRAM 148 or DRAM 147 via the memory I/F circuit 144. The texture engine circuit 143 obtains the (R. G, B) data S148 stored at the texture address corresponding to the (s, t) data by reading the texture data stored in the SRAM 148 or in the texture buffer 147a via the memory I/F circuit 144.

Here, the texture data stored in the texture buffer 147a is stored in the SRAM 148 as explained above.

The texture engine circuit 143 generates pixel data S143 by combining etc. the (R. G. B) data in the read (R, G, B) data S148 and the (R, G, B) data included in the DDA data S142 from the former triangle DDA circuit 142.

The texture engine circuit 143 outputs the pixel data S143 to the memory I/F circuit 144.

Note that in the texture buffer 147a, MIPMAP (texture for a plurality of resolutions) and other texture data corresponding to a plurality of reducing rates is stored. Here, which reducing rate texture data to use is determined in the above triangular units using a predetermined algorithm.

In the case of a full color mode, the texture engine circuit 143 directly uses the (R, G, B) data read from the texture buffer 141a.

In the case of an index color mode, the texture engine circuit 143 reads a color look-up table (CLUT), prepared in advance, from the texture CLUT buffer 147d, transfers and stores the same in the built-in SRAM, and uses the color look-up table to obtain the (R, G, B) data corresponding to the color index read from the texture buffer 147a.

Memory I/F Circuit 144

The memory I/F circuit 144 compares the z-data corresponding to the pixel data S143 input from the texture engine circuit 143 with the z-data stored in the z-buffer 1471 and judges whether the image drawn by the input pixel data S143 is positioned closer to the viewing point than the image written in the display buffer the previous time. When it is judged that the image drawn by the input pixel data S143 is positioned closer, the memory I/F circuit 144 updates the z-data stored in the z-buffer 147c by the z-data corresponding to the image data S143.

Also, the memory I/F circuit 144 writes the (R, G, B) data to the display buffer 147b.

Furthermore, the memory I/F circuit 144 reads the (R, G, B) data S148 stored in the SRAM 148 when receiving a read request Including the generated texture coordinate data (u, v) from the texture engine circuit 143 to the SRAM 148.

Also, when receiving a request for reading display data from the CRT control circuit 145, the memory I/F circuit 144 reads a certain amount of the display data, for example, in units of 8 pixels or 16 pixels, from the display buffer 147b in response to the request.

The memory I/F circuit 144 performs accessing (writing or reading) to the DRAM 147 and to the SRAM 148 in this way, but the write path and a read path are structured as separate paths.

Namely, when writing, a write address ADRW and write data DTW are processed in the write system and written to the DRAM 147, while when reading, processing is carried out in the read system to read from the DRAM 147 or the SRAM 148.

The memory I/F circuit 144 performs accessing to the DRAM 147 based on a predetermined interleave type addressing in, for example, 16-pixel units.

Below, an example of a specific configuration of the memory I/F circuit 144 will be explained with reference to FIG. 3.

The memory I/F circuit 144 comprises, as shown in FIG. 3, a distributer 300, address converters 310, 320, 330, and 340, memory controllers 350, 360, 370, and 380, and a read controller 390.

At the time of writing, the distributer 300 receives as input 16 pixels worth of (R, G, B) data DTW and a write address ADRW, divides them into four image data S301, S302, S303, and S304, and outputs the image data and the write address to the address converters 310, 320, 330, and 340.

Here, the (R, G, B) data for one pixel is composed of eight bits and the z-data is composed of 32 bits.

When writing, the address converters 310, 320, 330, and 340 convert the addresses corresponding to the (R. G, B) data and the z-data input from the distributer 300 to addresses in the memory modules 200, 210, 220, and 230 and output the respectively converted addresses S310, S320, S330, and S340 and the divided image data to the memory controllers 350, 360, 370, and 380.

Figure 14:
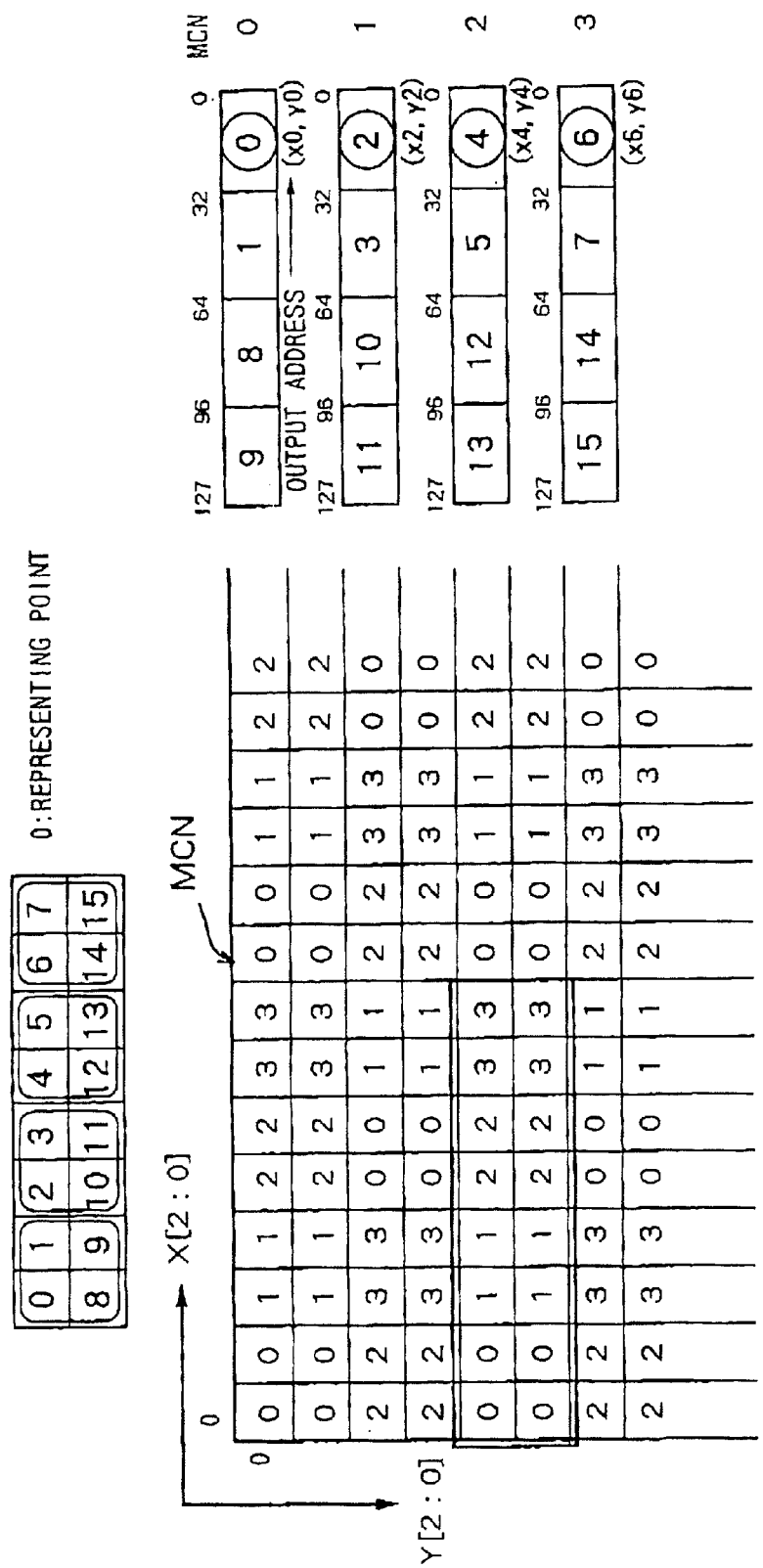
FIG. 14 is a view for explaining the image data processing of a distributer in a memory I/F circuit according to the present invention.
Figure 15:
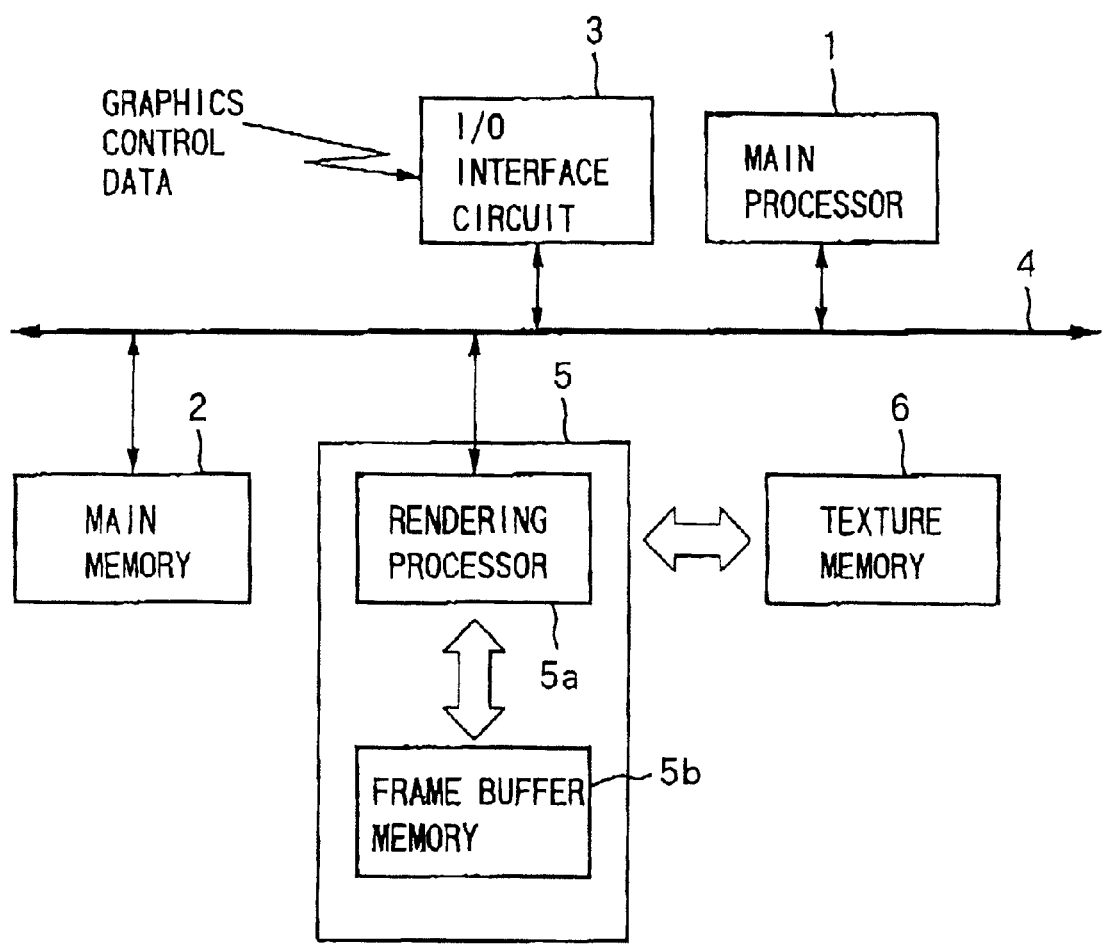
FIG. 15 is a view of the system configuration showing the basic concept of a three-dimensional computer graphic system.

FIG. 14 is a schematic view of the image data processing (pixel processing) of the distributer 300.

This figure corresponds to the above FIGS. 4 to 7. The distributer 300 performs image data processing for the DRAM 147 in order that data of, for example, 2×8 pixels, that is, 16 pixels, can be simultaneously accessed.

Then, the distributor 300 performs image data processing in order to give addressing for access (writing, reading) to a region of a boundary of 8 pixels in the x-direction and an even number of boundaries in the y-direction.

As a result, in the DRAM 147, the top of access always becomes a memory cell number MCN "0", not "1", "2", or "3", so occurrence of page violations etc. can be prevented.

Also, the distributer 300 performs image data processing for the DRAM modules 220 to 230 in order that adjacent portions in a display region are arranged at different DRAM modules.

As a result, when drawing a plane such as a triangle, simultaneous processing on the plane is possible, so the probability of operation of the respective DRAM modules becomes very high.

The memory controllers 350, 360, 370, and 380 are respectively connected to the memory modules 200, 210, 220, and 230 via a wiring group of the write system 401W, 402W, 411W, 412W, 421W, 422W, 431W, and 432W and a wiring group of the read system 401R, 402R, 411R, 412R, 421R, 422R, 431R, and 432R and control access to the memory modules 200, 210, 220, and 230 at the time of writing and reading.

Specifically, when writing, the memory controllers 350, 360, 370, and 380 are output from the distributer 300, and the (R, G, B) data and z-data for 4 pixels input from the address converters 350, 360, 370, and 380 are simultaneously written to the memory modules 200, 210, 220, and 230 via the wiring group of the write system 401W, 402W, 411W, 412W, 421W, 422W, 431W, and 432W.

At this time, for example, in the memory module 200, the (R, G, B) data and z-data for 1 pixel are stored in each of the banks 201A, 201B, 202A, and 202B. The same is true for the memory modules 210, 220, and 230.

Also, the memory controllers 350, 360, 370, and 380 output idle signals S350, S360, S370, and S380 to the read controller 390 as active when their own state machines are in an idle state. Receiving read addresses and a read request signal S391 by the read controller 390 in response to the idle signals S350, S360, S370, and S380, the memory controllers 350, 360, 370, and 380 read data via the wiring group of the read system 401R, 402R, 411R, 412R, 421R, 422R, 431R, and 432R and output the same to the read controller 390 via the wiring group of the read system 351, 361, 371, and 381 and a wiring group 440.

Note that, in this embodiment, the number of wires of the wiring group of the write system 401W, 402W, 411W, 412W, 421W, 422W. 431W, and 432W and the wiring group of the read system 401R, 402R, 411R, 412R, 421R, 422R, 431R, and 432R is 128 (128 bits). The number of wires of the wiring groups 351, 361, 371, and 381 of the read system is 256 (256 bits). The number of wires of the wiring group 440 of the read system is 1024 (1024 bits).

The read controller 390 is configured by an address converter 391 and a data processing portion 392.

When receiving a read address ADRR, if the address converter 391 receives all of the idle signals S350, S360, S370, and S380 from the memory controllers 350, 360, 370, and 380 as active, the address converter 391 outputs read addresses and a read request signal S391 to the memory controllers 350, 360, 370, and 380 in order to read data in units of 8 pixels or 16 pixels in response to the idle signals S350, S360, S370, and S380.

The data processing portion 392 receives as input the texture data, the (R, G, B) data, the z-data, and the texture color look-up table data in units of 8 pixels or 16 pixels read from the memory controllers 350, 360, 370, and 380 via the wiring group 440, performs a predetermined processing, and outputs the result to a requested destination, for example, to the texture engine circuit 143 or the CRT control circuit 145.

As explained above, when all of the memory controllers 350, 360, 370, and 380 are in an idle state, the read controller 390 outputs the read addresses and read request signal S391 to the memory controllers 350, 360, 370, and 380 and receives the read data, therefore can synchronize the read data.

Accordingly, the read controller 390 does not require a first-in first-out (FIFO) circuit or other holding circuit for temporarily holding data. Thus, the size of the circuit can be reduced.

CRT Control Circuit 145

The CRT control circuit 145 generates an address for display on a not shown CRT in synchronization with given horizontal and vertical synchronization signals and outputs a request for reading the display data from the display buffer 147b to the memory I/F circuit 144. In response to this request, the memory I/F circuit 144 reads a certain amount of the display data from the display buffer 147b. The CRT controller 145 has a built-in FIFO circuit for storing the display data read from the display buffer 147b and outputs the index value of RGB to the RAMDAC circuit 146 at certain time intervals.

RAMDAC Circuit 146

The RAMDAC circuit 146 stores the R. G, B data corresponding to the respective index values. It transfers R. G, B data of a digital format corresponding to the index value of RGB input from the CRT controller circuit 145 to a not illustrated digital/analog (D/A) converter to generate R, G, B data of an analog format. The RAMDAC circuit 146 outputs the generated R, G, B data to the CRT.

Next, the operation resulting from the above configuration will be explained.

In the three-dimensional computer graphic system 10, data of drawing graphics etc. are supplied from the main memory 12 of the main processor 11 or from the I/O interface circuit 13, which receives graphic data from the outside, to the rendering circuit 14 via the main bus Note that the data for drawing graphics etc. are, in accordance with need, subjected to coordinate conversion, clipping, lighting, and other geometric processing in the main processor 11 etc.

The graphic data after the geometric processing becomes polygon rendering data S11 composed of the coordinates x, y, z of the respective three vertexes of a triangle, the luminance values R, G, B, the texture coordinates s, t, q corresponding to the pixel to be drawn, etc.

The polygon rendering data S11 is input to the DDA set-up circuit 141 of the rendering circuit 14.

In the DDA set-up circuit 141, change data S141 indicating the difference of a side of the triangle from a horizontal direction etc. is generated based on the polygon rendering data S11. Specifically, the change, that is, the amount of change of the values to be obtained in the case of movement by a unit length, is calculated by using the starting point, the end point, and the distance between the two and output to the triangle DDA circuit 142 as change data S141.

In the triangle circuit 142, the change data S141 is used for calculation of the linearly interpolated data (z, R, G, B, s, t, q) of each of the pixels inside the triangle.

Then, the calculated (z, R, G, B, s, t, q) data and the (x, y) data of each of the vertexes of the triangle are output from the triangle DDA circuit 142 to the texture engine circuit 143 as DDA data S142.

In the texture engine circuit 143, the operation for dividing the data s by the data q and the operation for dividing the data t by data Q are performed for the (s, t, q) data indicated by the DDA data S142. Then, the texture sizes USIZE and VSIZE are respectively multiplied with the division results "s/q" and "t/q" to generate the texture coordinate data (u, v).

Next, a read request including the above generated texture coordinate data (u, v) is output from the texture engine circuit 143 to the memory I/F circuit 144. Then, the (R. G, B) data S148 stored in the SRAM 148 is read via the memory I/F circuit 144.

Next, in the texture engine circuit 143, the (R, G. B) data in the read (R, G, B) data S148 and the (R, G, B) data included in the DDA data S142 from the triangle DDA circuit 142 in the former stage are combined to generate the pixel data S143.

This pixel data S143 is output from the texture engine circuit 143 to the main memory I/F circuit 144.

In the case of a full color mode, the (R, G, B) data read from the, texture buffer 147a can be directly used, while in the case of an index color mode, data In the color look-up table (CLUT), prepared in advance, is transferred from the texture CLUT buffer 141d to a buffer for temporary storage, which is configured by an SRAM etc. By using the CLUT of the temporary storage buffer, the actual R. G, B colors can be obtained from the color index.

Note that when the CLUT is configured by an SRAM, when a color index is input to an address of the SRAM, the actual R, G, B colors are output.

In the memory I/F circuit 144, the z-data corresponding to the pixel data S143 input from the texture engine circuit 143 and the z-data stored in the z-buffer 147c are compared for judging whether the image drawn by the input pixel data S143 is positioned closer to the viewing point than the image written in the display buffer the previous time.

When it is judged that the image drawn by the input pixel data S143 is positioned closer, the z-data stored in the buffer 147c Is replaced by the z-data corresponding to the image data S143.

Next, in the memory I/F circuit 144, the (R. G, B) data is written in the display buffer 147b.

The data to be written (including updated) is supplied to the memory controllers 350, 360, 370, and 380 via the distributer 300 and the address decoders 310, 320, 330, and 340, which are write system circuits, and written to predetermined memories in parallel by the memory controllers 350, 360, 370, and 380 via the wiring groups of the write system 401W, 402W, 411W, 412W. 421W, 422W, 431W, and 432W.

In the memory I/F circuit 144, the memory block storing the texture corresponding to the texture address of the pixel to be drawn is calculated from the texture address, a read request is made only to the memory block, and the texture data is read.

In this case, since there is no access for reading texture in memory block which do not store the corresponding texture, it is possible to provide more time for access for drawing.

In the same way for drawing, a memory block storing pixel data corresponding to a pixel address to be drawn is accessed to read the pixel data from the corresponding address for modify writing, the data is modified, then is written back to the same address.

When performing hidden plane processing, again in the same way, a memory block storing depth data corresponding to a pixel address to be drawn is accessed to read the depth data from the corresponding address for modify writing, the data is modified if necessary, then is written back to the same address.

In such transfer of data with the DRAM 147 based on the memory I/F circuit 144, the drawing performance can be improved by performing the processing up to herein parallel.

Especially, a plurality of pixels can be simultaneously calculated by the means of partially increasing the operating frequency by providing the triangle DDA circuit 142 and the texture engine circuit 143 portions in the same circuit in a parallel execution mode (spatial parallel) or by inserting a lot of pipelines (time parallel).

Also, the pixel data is arranged so that the adjacent portions in the display region are in different modules under the control of the memory I/F circuit 144.

Due to this, the processing is simultaneously carried out on a plane when drawing a plane such as a triangle. Therefore, the probability of operation of the respective DRAM modules is quite high.

When displaying an image on a not illustrated CRT, in the CRT control circuit 145, the display address is generated in synchronization with the given horizontal and vertical synchronization frequencies and a request for transferring the display data is sent to the memory I/F circuit 144.

In the memory I/F circuit 144, in accordance with the request, a certain amount of the display data is transferred to the CRT control circuit 145.

In the CRT control circuit 145, the display data is stored in a not illustrated display use FIFO, etc., and index values of RGB are transferred to the RAMDAC 146 at certain intervals.

Note that when a request is made to the memory I/F circuit 144 for reading data stored in the DRAM 147 or in the SRAM 148 as explained above, the read address ADRR is input to the address converter 391 of the read controller 390.

At this time, in the address converter 391, whether or not the address signals S350, S360, S370, and S380 from the memory controllers 350, 360, 370, and 380 are input as active is checked. When all of the address signals S350. S360, S370, and S380 are input as active, the read addresses and read request signal S391 are output to the respective memory controllers 350, 360, 370, and 380 in order to read data in units of 8 pixels or 16 pixels in response to the address signals S350, S360, S370, and S380.

Receiving the read addresses and the read request signal S391, the texture data, the (R, G, B) data, the z-data, and the texture color look-up table data are read in units of 8 pixels or 16 pixels in parallel via the wiring groups 401R, 402R, 411R, 412R, 421R, 422R, 431R, and 432R of the read system in the memory controllers 350, 360, 370, and 380, then input to the data processing portion 392 via the wiring groups 351, 361, 371, and 381 of the read system and the wiring group 440.

Then, predetermined processing is carried out in the data processing portion 392 and the result is output to the requested destination, such as the texture engine circuit 143 or the CRT control circuit 145.

In the RAMDAC 146, RGB values with respect to RGB indexes are stored inside; the RAM and the RGB values with respect to the index values are transferred to a not illustrated D/A converter.

Then, the RGB signal converted into an analog signal by the D/A converter is transferred to the CRT.

As explained above, according to the present embodiment, since the built-in DRAM 147 inside a semiconductor chip is configured to store the display data and the texture data required by at least one graphic element, the texture data can be stored in portions other than the display regions. Therefore, the built-in DRAM can be used efficiently, and an image processing apparatus achieving both high speed operation and reduced power consumption can be realized.

Further, a single memory system can be realized and all processing can be carried out inside. As a result, there is a large paradigm shift in terms of the architecture as well.

Also, since the memory can be efficiently used, the processing can be carried out by just the DRAM included inside. Therefore, the wide bandwidth between the memory and the drawing system resulting from the internal provision can be sufficiently utilized. Also, it becomes possible to install specific processing In the DRAM.

Also, by giving identical functions in the memory circuit in parallel as a plurality of independent modules, the efficiency of parallel operations is improved. When the number of bits of the data is simply large, the efficiency of use of data is deteriorated and improvement of the performance is limited to cases of certain conditions. To improve the average performance, bit lines can be efficiently used by providing a plurality of modules having certain degrees of functions.

Further efficient usage of the bit lines becomes possible by arranging the display elements at adjacent addresses to be different blocks of the DRAM from each other in the display address space. When there are frequent accesses to relatively fixed display regions as in drawing graphics, the probability increases of the modules being able to perform processing simultaneously and the drawing performance can be improved.

Further, since indexes of index colors and values of a color look-up table therefor are stored inside the built-in DRAM 147 in order to store more texture data, the texture data can be compressed and the built-in DRAM can be efficiently used.

Also, since depth information of an object to be drawn is stored in the built-in DRAM, hidden plane processing can be performed simultaneously and in parallel with the drawing.

Normally, the drawn picture is desired to be displayed, however, since it is possible to store the texture data and the display data together as a unified memory in the same memory, system, the drawing data can be used as texture data instead of being used for direct display.

This is effective when preparing the necessary texture data by drawing when necessary. This is also an effective function for preventing the amount of the texture data from swelling.

Also, by providing the DRAM inside the chip, the high speed interface portion is completed just inside the chip, so it is no longer necessary to drive an I/O buffer having a large additional capacity or a wiring capacity between chips. Therefore, the power consumption can be reduced compared with a not built-in case.

Accordingly, a setup which uses a variety of techniques to enable everything to be accommodated in a single chip is becoming an essential technical element for future digital equipment such as portable data terminals.

Note that the present invention is not limited to the above embodiments.

In the three-dimensional computer graphic system 10 shown in FIG. 1, the example was given of a configuration using an SRAM 148, however, it can be configured without the SRAM 148 as well.

Furthermore, in the three-dimensional computer graphic system 10 shown in FIG. 1, the example was given wherein the geometric processing for generating the polygon rendering data was performed in the main processor 11, but the processing can be carried out in the rendering circuit 14 as well.

As explained above, according to the present invention, since the memory circuit provided along with the logic circuit inside a semiconductor chip is configured to store the display data and the texture data required by at least one graphic element, the texture data can be stored in portions other than the display regions, so the built-in memory circuit can be used efficiently and an image processing apparatus achieving both high speed operation and reduced power consumption can be realized.

Further, a single memory system can be realized and all processing can be carried out inside. As a result, there is a large paradigm shift in terms of the architecture as well.

Also, since the memory can be efficiently used, the processing can be carried out by just the memory included inside. Therefore, the wide bandwidth between the memory and the drawing system resulting from the internal provision can be sufficiently utilized. Also, it becomes possible to install specific processing in the memory.

Also, by giving identical functions in the memory circuit in parallel as a plurality of independent modules, the efficiency of parallel operations is improved.

Furthermore, since the display elements at adjacent addresses are arranged to be in different memory blocks to each other in the display address space, when there are frequent accesses to relatively fixed display regions as in drawing graphics, the probability increases of the respective modules being able to perform the processing simultaneously, so the drawing performance can be improved.

Further, since indexes of index colors and values of a color look-up table therefor are stored inside the built-in memory in order to store more texture data, the texture data can be compressed and the built-in memory can be efficiently used.

Also, since depth information of an object to be drawn is stored in the built-in memory, hidden plane processing can be performed simultaneously and in parallel with the drawing.

Further, since it is possible to store the texture data and the display data together as a unified memory in the same memory system, the drawing data can be used as texture data instead of being used for direct display.

Also, by providing the memory inside the chip, the high speed interface portion is completed just inside the chip, so it is no longer necessary to drive an I/O buffer having a large additional capacity or a wiring capacity between chips. Therefore, the power consumption can be reduced compared with a not built-in case.

While the invention has been described with reference to specific embodiment chosen for purpose of illustration, it should be apparent that numerous modifications could be made thereto by those skilled in the art without departing from the basic concept and scope of the invention.

What is claimed is:

1. An image processing apparatus for performing rendering by receiving polygon rendering data including three-dimensional coordinates (x, y, z), R (red), G (green), and B (blue), homogeneous coordinates (s, t) of a texture, and a homogeneous term q with respect to vertexes of a unit graphic, said image processing apparatus comprising:

a memory circuit for storing display data and texture data required by at least one graphic element;

an interpolation data generation circuit for interpolating the polygon rendering data of vertexes of the unit graphic to generate interpolation data of pixels positioned inside the unit graphic; and a texture processing circuit for dividing the homogeneous coordinates (s, t) of a texture included in the interpolation data by the homogeneous term q to generate "s/q" and "t/q", using a texture address corresponding to the "s/q" and "t/q" to read texture data from the memory circuit, and applying the texture data on the surface of the graphic element of the display data;

the memory circuit, the interpolation data generation circuit, and the texture processing circuit being accommodated in one semiconductor chip.

2. An image processing apparatus as set forth in claim 1, wherein said memory circuit is divided into a plurality of modules having identical functions and said modules are accessed in parallel.

3. An image processing apparatus as set forth in claim 2, wherein display elements at adjacent addresses in a display address space are arranged to be different memory blocks in said memory circuit.

4. An image processing apparatus as set forth in claim 1, wherein indexes in index colors and values of a color look-up table for referring to colors are stored in said memory circuit.

5. An image processing apparatus as set forth in claim 1, wherein information of a depth of an object to be drawn is stored in said memory circuit.

6. An image processing apparatus for performing rendering by receiving polygon rendering data including three-dimensional coordinates (x, y, z), R (red), G (green), and B (blue), homogeneous coordinates (s, t) of a texture, and a homogeneous term q with respect to vertexes of a unit graphic, said image processing apparatus comprising:

a memory circuit for storing display data and texture data required by at least one graphic element;

a set-up circuit for obtaining a change inside a triangle composed of said vertexes;

an interpolation data generation circuit for interpolating the polygon rendering data of vertexes of the unit graphic to generate interpolation data of pixels positioned inside the unit graphic; and a texture processing circuit for dividing the homogeneous coordinates (s, t) of a texture included in the interpolation data by the homogeneous term q to generate "s/q" and "t/q", using a texture address corresponding to the "s/q" and "t/q" to read texture data from the memory circuit, and applying the texture data on the surface of the graphic element of the display data;

the memory circuit, the set-up circuit the interpolation data generation circuit, and the texture processing circuit being accommodated in one semiconductor chip.

7. An image processing apparatus as set forth in claim 6, wherein the memory circuit is divided into a plurality of modules having identical functions and the modules are accessed in parallel.

8. An image processing apparatus as set forth in claim 7, wherein display elements at adjacent addresses in a display address space are arranged to be different memory blocks in the memory circuit.

9. An image processing apparatus as set forth in claim 6, wherein indexes in index colors and values of a color look-up table for referring to colors are stored in the memory circuit.

10. An image processing apparatus as set forth in claim 6, wherein information of a depth of an object to be drawn is stored in the memory circuit.

* * * * *